Patented Oct. 14, 1941

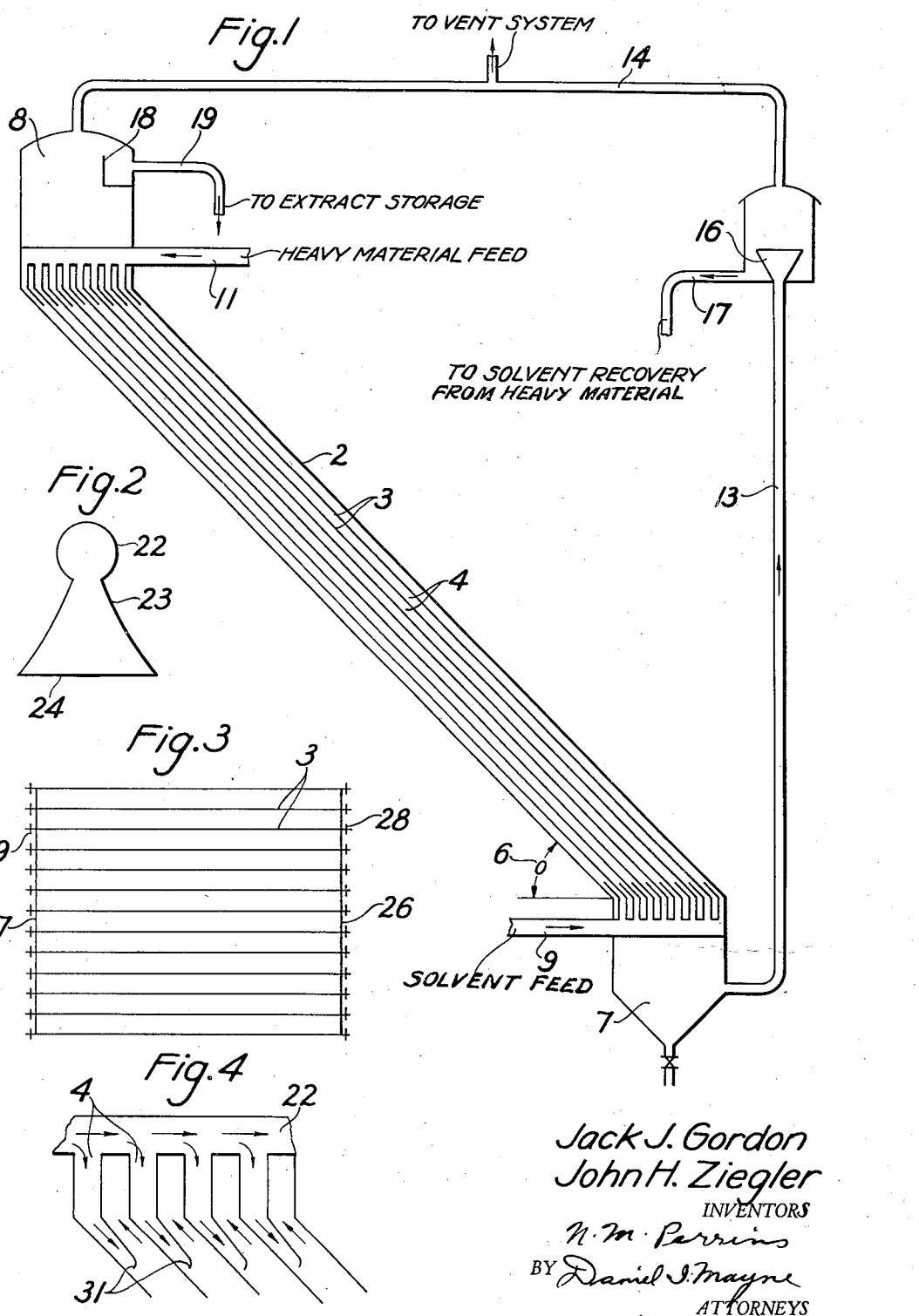

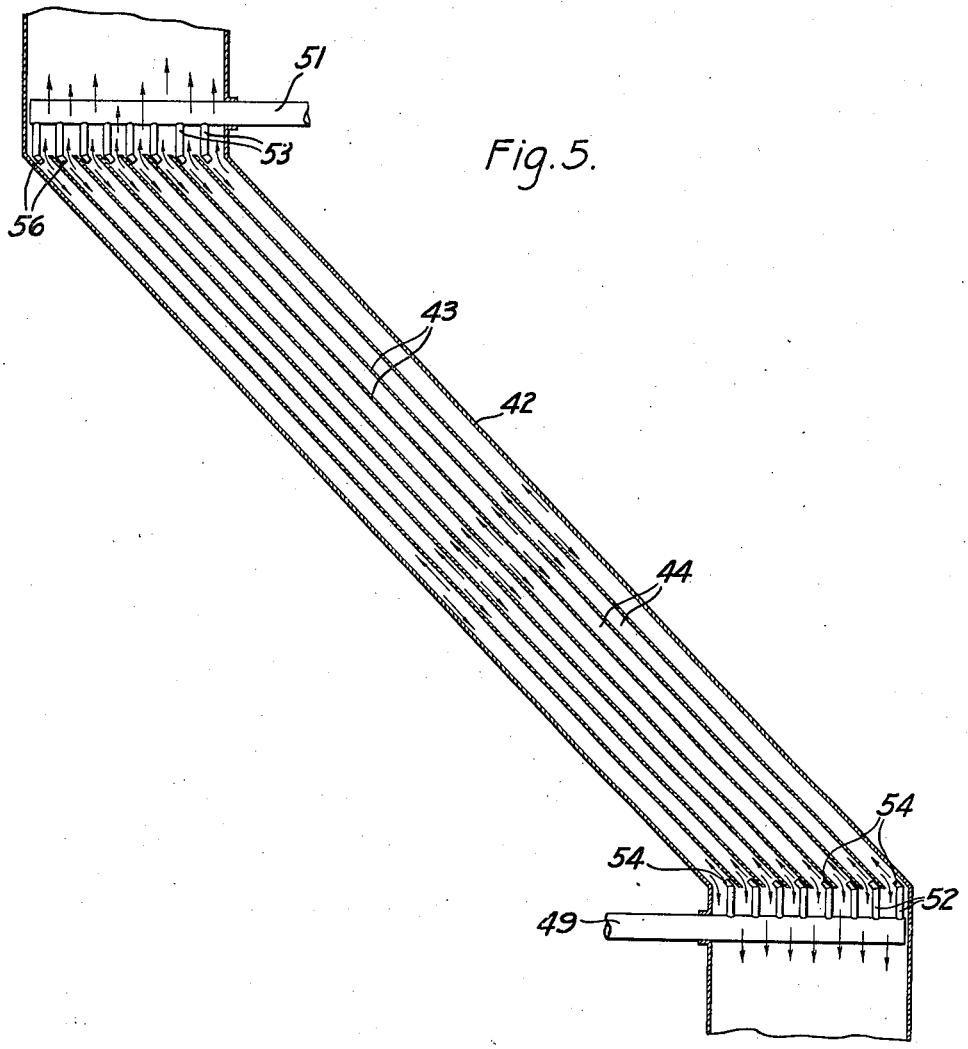

2,258,982

UNITED STATES PATENT OFFICE 2,258,982

EXTRACTION APPARATUS

Jack J. Gordon and John H. Zeigler, Kingsport, Tenn., assignors to Eastman Kodak Company, Rochester, N. Y., a corporation of New Jersey Application December 8, 1938, Serial No. 244,654

6 Claims. (Cl. 23—270.5)

This invention relates to an improved apparatus for carrying out extraction processes such as countercurrent, liquid-liquid extraction and more particularly to apparatus and processes applicable to liquid-solvent systems which tend to emulsify.

In our copending application 751,483, now Patent No. 2,176,899, we have described an apparatus and process which may be employed in the extraction of various materials. However, in some instances it is desirable to carry out extraction without material intermixture of the solvent and solute.

It has been proposed in the prior art to employ vertical columns for extraction in which a series of films are spread on horizontal trays between which a condition of turbulent flow exists. That is, in the prior art, where a series of film flows have been employed, the procedure has been such that the solute flows through (thereby coming in admixture with the solvent) and countercurrent to the solvent. In any such vertical column, baffled or otherwise, since any type of horizontal inclined baffles in a vertical column will tend to spread the minor phase into films on their baffled surfaces and project these films into the major phase where they will be momentarily bound on both sides, the various constituents will become dispersed, intermixed and emulsified.

We have found that by a suitably constructed extraction apparatus and by proper extraction procedure, a material may be readily extracted by a solvent, even though emulsification would tend to take place under prior art extraction procedure by spreading the solvent and material to be extracted into two different layers and causing one layer to flow in contact with the other in such a way that large surfaces of the layers are exposed to one another at all times, without the two mixing or being materially dispersed one within the other.

This invention has for one object to provide an improved apparatus adapted for carrying out countercurrent liquid-liquid extraction processes. Another object is to provide an extraction apparatus particularly applicable to liquid-solvent systems which tend to emulsify if intermixed. Still another object is to provide an apparatus wherein efficient extractive contact may be obtained without mixing. Still another object is to provide an extraction apparatus wherein the flow of solvent and solute may be controlled. A still further object is to provide an extraction apparatus particularly suitable for use in extracting aqueous solutions containing at least one lower aliphatic acid, with solvents for the acid.

Another object is to provide a method of extraction for treating various liquids which tend to emulsify if intermixed. Another object is to provide a method of extracting aqueous solutions of lower aliphatic acids with solvents for the acid. Other objects will appear hereinafter.

For a more complete understanding of our invention, reference is made to the attached drawings forming a part of the present application.

Fig. 1 is a semi-diagrammatic side elevation view of one arrangement of apparatus which might be employed for carrying out our invention.

Fig. 2 is an end view of one of the feed elements of our apparatus.

Fig. 3 is a cross-sectional view of one form of extractor column which may be employed in our apparatus.

Fig. 4 is a cross-section view on large scale, graphically indicating the flow of liquids in our apparatus.

Fig. 5 is a semi-diagrammatic side elevation view in which some of the parts are shown in cross-section, showing on a large scale, a portion of the parts comprising Fig. 1.

Referring now to Fig. 1, 2 represents the extractor housing. Positioned therewithin are a plurality of plates or fins 3. These parts are so arranged to obtain a plurality of elongated ducts 4. The dimensions of these ducts may be varied, depending upon the particular liquids to be contacted, the degree of extraction desired and other such factors. However, usually the ducts will be very long and have a rectangular cross-section of one-half inch or less thickness. The width of the ducts may be several feet, if desired, and usually the ducts will be a number of feet long. These ducts are inclined at any suitable angle 6 to the horizontal, depending upon the capacity desired, the relative density of the two liquids, and other such factors.

The housing terminates at each end in discharge vessels 7 and 8. Each end of the ducts is fitted with feeding means 9 and 11, to be described in further detail with respect to Fig. 2.

The discharge vessels are associated with a balance leg or throttling means 13 and a vent system 14 for offsetting the pressure created by the head of the liquid within the duct or ducts. This balance leg leads to the funnel-shaped discharge 16, which is connected to the overflow conduit 17.

Discharge vessel 8 is equipped with baffle or dam construction 18, positioned in front of the overflow 19.

Referring now to Fig. 2, which shows one type of feeding means which may be employed in our apparatus, there may be provided a feeder pipe 22. Radiating from this feeder pipe are a plurality of fan-shaped distribution ducts 23, the orifices 24 of which may be substantially the width of the ducts into which they feed. The construction of Fig. 2 would be attached to conduits 9 and 11 of Fig. 1.

Fig. 3 diagrammatically indicates one way in which our extraction ducts may be constructed. The partition plates 3 would be positioned between the side walls 26 and 27. As already indicated, the partition plates may be several feet wide but are positioned relatively close together, preferably within a few inches. Also, it is preferred that the plates be detachably mounted as at 28 and 29 so that the apparatus may be disassembled for cleaning or repairing or for adding or removing plates, thereby increasing or decreasing the thickness of the duct.

Referring now to Fig. 4, it will be observed that lips 31 may be present on the edge of certain of the plates. The liquid flowing in conduit 22 divides and passes into the several ducts 4 and flowing over the lip 31 comes in contact with the other liquid flowing up the duct and passing above the lips 31.

Fig. 5, as indicated above, is substantially similar to a portion of Fig. 1. That is, 42 represents the extractor housing. 43 shows on a somewhat larger scale than in Fig. 1, the plates or fins which may be contained within the extractor housing. As indicated, these various parts may be constructed of sheet metal or the like of more or less the same thickness. The ducts 44 correspond to those designated 4 in Fig. 1. The conduits 49 and 51 correspond to 9 and 11 respectively, of Fig. 1. It will be observed that these conduits are provided with a plurality of nozzles 52 and 53. These nozzles terminate in suitable distribution means 54 and 56. The construction of these various parts may be further understood by considering Fig. 5 in conjunction with Fig. 2. That is, for example, the part 24 of Fig. 2 would correspond to the flared tap 54 or 56 of Fig. 5, the conduit 22 of Fig. 2 representing the general construction, for example of conduits 49 and 51 of Fig. 5. It will be noted that parts 54 are positioned in offset relationship to parts 56 so that one group discharges against one portion of the conduit and another group against another portion thereof.

A further understanding of the functioning of our apparatus will be had from the following example described with particular reference to Fig. 1. The apparatus is first charged with the liquid to be extracted and the solvent in the ratio at which the extraction is to be made. Usually the quantity of solvent would be several times that of the liquid to be extracted. This charging operation may be carried out by introducing the heavy liquid first into the lower part of the unit and the lighter one above it. When charged, both discharge vessels should be at the point of overflow. That is, the surface of the heavier liquid should be approximately level with the edge of overflow funnel 16. The relative positions of 16 and 18 to attain this equilibrium are determined by the relative densities of two liquids and their ratio in the extraction.

The lighter liquid, as for example ester-alcohol, ketone, or other type solvent, is now fed by gravity or forced feed into the lower feeder 9 where it is distributed to the several ducts and flows upwardly along their upper surfaces. At approximately the same time the heavier liquid to be extracted, as for example aqueous solutions containing one or more lower aliphatic acids such as acetic, propionic or the like, is fed into the upper feeder 11, where it is distributed and flows downwardly along the lower surface of the ducts. Extraction without emulsification readily takes place and the heavy liquid from which the acid has been removed, flows into the lower discharge vessel 7 through the conduit 13 and overflows at 16 into the conduit 17, which may lead to a stripping column. The lighter liquid which has extracted the desired material, flows into the upper vessel 8 and overflows over the dam 18 into conduit 19 to extract storage, distillation or other treatment as may be desired. The two streams as they pass each other within the several ducts offer large surfaces to intimate contact without in any way becoming mixed to a material degree.

While our apparatus is particularly adapted for extracting aqueous solutions containing aliphatic acid, as aqueous acetic acid solutions, with various solvents such as esters, ethers and ketones or mixtures thereof, our apparatus may be employed for other purposes, as for example contacting sulfuric acid with hydrocarbons.

Our apparatus may be constructed of various materials depending upon the use to which it is to be put. For treating aqueous aliphatic acid solutions the various parts may be constructed of copper or copper alloys. For other purposes, it may be desirable to construct the apparatus from stainless steel, iron silicon alloys, aluminum alloys or in some instances the various parts may be constructed of glass or rubber lined metal.

Our apparatus represents an improvement over ordinary extraction towers and the like, as already pointed out, in that our process may be carried out so that the liquids do not at any time become emulsified. Our apparatus is an improvement over other apparatus which have been proposed, due to its simplified design and control.

While we have described introducing the solvent into the lower part of the apparatus, in employing certain solvents, introduction would be into the upper portion of the apparatus. The treatments may be carried out in the cold or the various liquids may be heated to some extent, if desired. Our invention is susceptible of some modification, hence, we do not wish to be restricted excepting insofar as is necessitated by the prior art and the spirit of the appended claims.

What we claim is:

1. Apparatus for liquid-liquid extraction without substantial emulsification, comprising a plurality of elongated ducts which are very broad and long relative to their thickness, said ducts being positioned at a considerable angle to the vertical, thus providing an upper top surface and a lower bottom surface, the ducts terminating in upper and lower chambers, individual feed means for each duct, flaringly constructed to extend across substantially the entire width of the upper surface of the duct and positioned to feed against the upper surface thereof, similar feed means at the other end of the ducts positioned to feed against the lower surface of the ducts, and a vertical tube provided with an overflow so constructed and arranged that the column of liquid therein offsets the weight of the column of liquid in the ducts, connected with said lower chamber.

2. Apparatus for countercurrent, liquid-liquid extraction without substantial emulsification, comprising at least one elongated duct, broad and long relative to its thickness, said duct being positioned at an angle to the vertical, thus providing an upper top surface and a lower bottom surface, the duct terminating in chambers, individual feed means for the duct, flaringly constructed to extend across substantially the entire width of the upper surface of the duct and positioned to feed against this surface of the duct, and a similar feed means at the other end of the duct positioned to feed against the other surface of the duct.

3. Apparatus for extraction comprising a plurality of elongated ducts which are very broad and long relative to their thickness, said ducts being positioned at an angle to the vertical, thus providing an upper top surface and a lower bottom surface, the ducts terminating in upper and lower chambers, individual feed means for each duct, flaringly constructed to extend across substantially the entire width of the upper surface of the duct and positioned to feed against this surface thereof, similar feed means at the other end of the ducts positioned to feed against the other surface of said ducts and tube means provided with an overflow so constructed and arranged that the column of liquid therein offsets the weight of the column of liquid in the ducts, connected with said lower chamber.

4. Apparatus for carrying out extraction between two liquids which tend to emulsify and which are of different specific gravities, which comprises a plurality of elongated ducts considerably longer and broader than thick, said ducts being inclined at a considerable angle to the vertical, thus providing an upper top surface and a lower bottom surface, individual feed means for the ducts, flaringly constructed to extend across at least the major portion of the width of the upper surface of the duct, for supplying one of said liquids in the form of a wide elongated thin film upon one of the surfaces of said ducts, similar means likewise extending across at least the major portion of the width thereof associated with the other end of said ducts for discharging the other of said liquids in the form of a wide elongated thin film against the other surface of said ducts and vertically extending conduit means provided with an overflow so constructed and arranged that the column of liquid therein offsets the weight of the column of liquid in the ducts, connected with the lower part of said apparatus.

5. Apparatus for carrying out extractions between a plurality of liquids which tend to emulsify, which comprises a plurality of elongated ducts which are very broad and long relative to their thickness, individual feed means for each duct, flaringly constructed to extend across at least a major portion of the surface of the duct at the lower end of said duct for discharging a thin film of certain of said liquids adjacent to the upper surface of said ducts, similar means associated with the upper end of said ducts for discharging thin films of another of the liquids against the lower surface of said ducts, and a vertically extending conduit means provided with an overflow so constructed and arranged that the column of liquid therein offsets the weight of the column of liquid in the ducts, connected with the lower part of said apparatus.

6. Apparatus for extraction comprising a plurality of demountable elongated ducts which are very broad and long relative to their thickness, said ducts being positioned at an angle to the vertical, depending upon the density of the liquids to be treated therein, the ducts terminating in upper and lower chambers, individual feed means for each duct, flaringly constructed to extend across substantially the entire width of the duct and positioned to feed against one surface thereof, similar feed means at the other end of the ducts positioned to feed against the other surface of the ducts, a vertically extending tube means provided with an overflow so constructed and arranged that the column of liquid therein offsets the weight of the column of liquid in the ducts connected with said lower chamber, and a housing provided with a vent system associated with the upper chamber and the vertically extending tube means.

JACK J. GORDON.
JOHN H. ZEIGLER.